United States Patent [19]

Hanano et al.

[11] Patent Number: 5,553,040
[45] Date of Patent: Sep. 3, 1996

[54] OFFSET COMPENSATION APPARATUS FOR TRACKING ERROR SIGNAL OF OPTICAL RECORDING REPRODUCTION APPARATUS

[75] Inventors: Masaaki Hanano; Masaru Nomura, both of Tenri, Japan

[73] Assignee: Sharp Kabushiki Kaisha, Japan

[21] Appl. No.: 258,714

[22] Filed: Jun. 13, 1994

[30] Foreign Application Priority Data

Jun. 21, 1993 [JP] Japan ..................... 5-149436

[51] Int. Cl.$^6$ ..................... G11B 7/09
[52] U.S. Cl. ..................... 369/44.34; 369/44.35; 369/54
[58] Field of Search ..................... 369/44.29, 44.31, 369/44.32, 44.33, 44.34, 44.35, 44.36, 54

[56] References Cited

U.S. PATENT DOCUMENTS 5,048,002 9/1991 Horie et al. ..................... 369/44.35
5,159,589 10/1992 Ohsato ..................... 369/44.35
5,170,384 12/1992 Edahiro et al. ..................... 369/44.35 X

FOREIGN PATENT DOCUMENTS 1-258232 10/1989 Japan.
4-38630 2/1992 Japan.

Primary Examiner—W. R. Young
Attorney, Agent, or Firm—Nixon & Vanderhye

[57] ABSTRACT

An offset compensation apparatus for a tracking error signal in an optical recording reproduction apparatus adds or subtracts a signal, which is proportional to the intensity of a read head laser beam, to or from a tracking error signal (which indicates the difference between a track of an optical disk and a a read head laser beam spot on the optical disk) so as to cancel offsets occur in the tracking error signal that are in proportion to the intensity of the read head laser beam and, thus, compensates for the offset in the tracking error signal. Since the offset compensation signal is also indicative of the amount of laser light irradiated to the optical disk, the offset can be compensated easily and accurately with a small scale simple circuit arrangement rather than using the larger-scale and more conventional divider attenuator combination of the prior art.

14 Claims, 5 Drawing Sheets

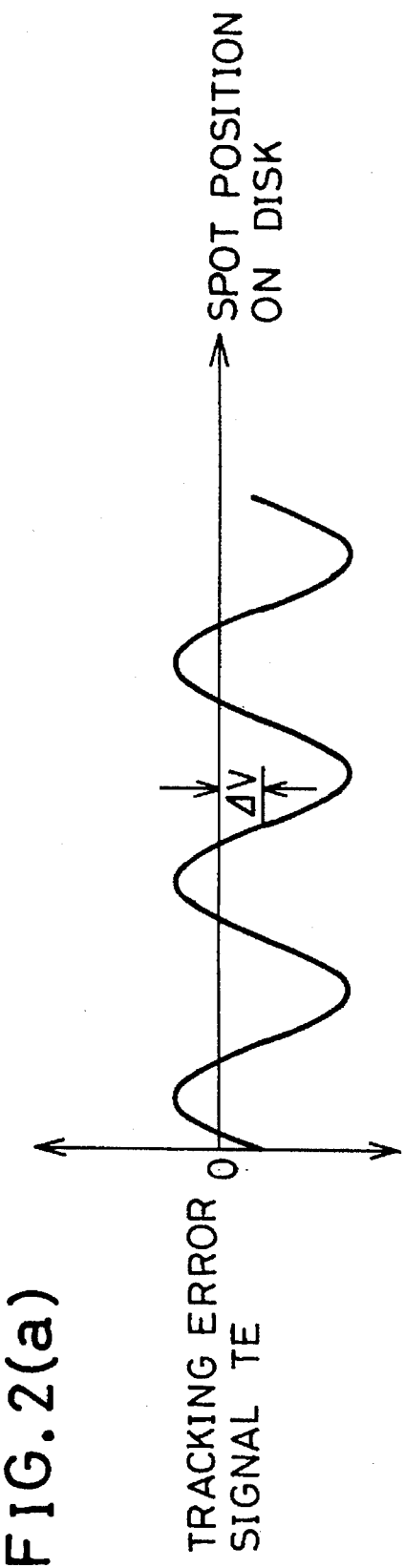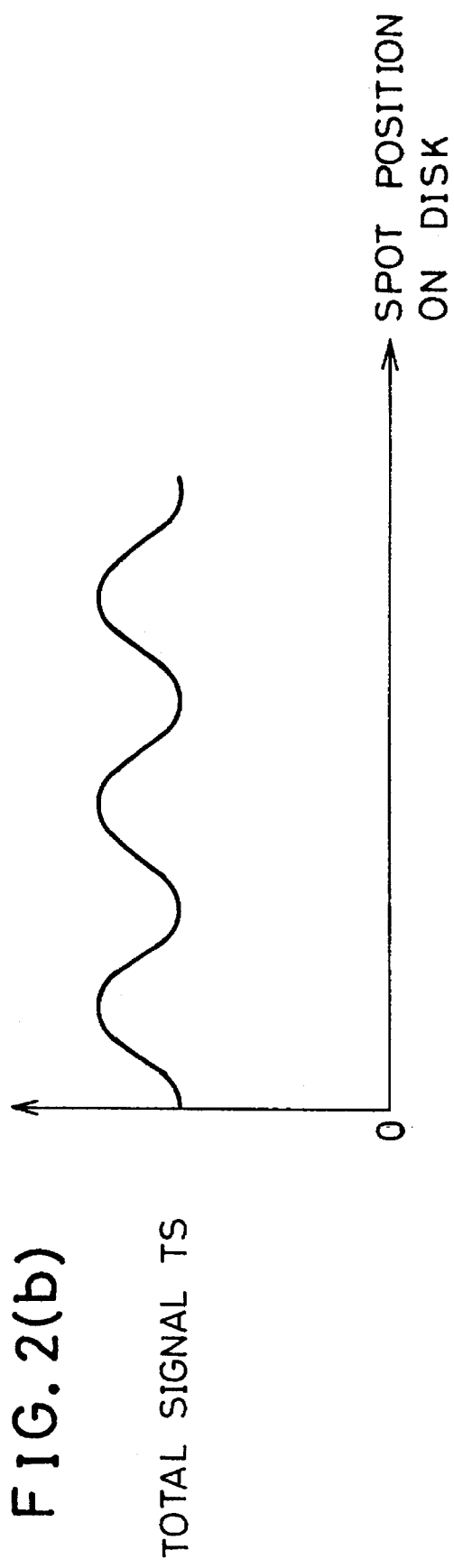
FIG.2(a)
FIG.2(b)

OFFSET COMPENSATION APPARATUS FOR TRACKING ERROR SIGNAL OF OPTICAL RECORDING REPRODUCTION APPARATUS

FIELD OF THE INVENTION

The present invention relates to an offset compensation apparatus for a tracking error signal of an optical recording reproduction apparatus which optically records and reproduces information of a magneto-optical disk apparatus, etc.

BACKGROUND OF THE INVENTION

In order to follow a specified track by a light beam spot when carrying out recording and reproducing of information for an optical disk, a tracking control for controlling a light beam spot position has been carried out. The tracking control detects a tracking error which is a radial difference between the track and the light beam spot on the optical disk, and is carried out based upon the detected tracking error. In order to detect the tracking error, a push-pull method is mostly used for an optical disk, especially on which recording will be carried out, from the standpoint of efficiency of using a light beam.

However, the position detection method by the push-pull method has a disadvantage. It is that a spot difference is detected by an error detector in spite of irradiating the light beam spot in the center of the track in the case of a slant of a disk, etc.

In this way, an offset of $\Delta V$ occurs in the tracking error signal when the spot difference occurs as shown in FIG. 3(a). A point where the tracking error signal becomes 0 is regarded as the center of the track, and the tracking control is made so as to control the position of the light beam spot. Therefore, in this case, the light beam spot control is carried out regarding not O point which shows that the true spot difference is equal to 0 but O' point which is off-centered as the center of the track, thereby preventing information from being correctly recorded and reproduced.

In addition, the offsets change as reflectance of the disk and the output of the laser beam change. For example, if in FIG. 3(b), the laser output increases to a times the output shown in FIG. 3(a), positive and negative amplitude of the tracking error signal become a times. Since the O point which shows the center of the true track is the middle point of the positive and negative amplitude, as apparent from FIG. 3(b), the offset becomes a times. For this reason, in order to carry out the accurate tracking control, the offset should be compensated as required in accordance with the disk reflectance and the laser output.

The following description will discuss a conventional example of the offset compensation method for the tracking error signal.

As to the first conventional example, there exists a method which has been disclosed in Japanese Laid-Open Patent Application No. 258232/1989 (Tokukaihei 1-258232). FIG. 4 shows the arrangement. An optical disk 1 is rotated by a drive motor 2. An optical pick-up 3 moves radially on the optical disk 1. A tracking error which is a radial difference on the optical disk 1 between the track and the light beam spot is detected by an optical system (not shown) in the optical pick-up 3, and becomes a tracking error signal TE via a tracking error detection circuit 4. The tracking error signal TE is sent to an amplifying circuit 5 and supplied to an addition circuit 6. An HF signal (information reproducing or "readback" signal) which is simultaneously obtained from the optical system (not shown) in the optical pick-up 3 is supplied to a head amplifier 12 via an HF signal detection circuit 11, and to a signal processing circuit 14 after being amplified. The HF signal is branched and its DC component is picked out by an LPF (low-pass filter) 13 so as to be adjusted for a suitable level by a variable resistor VR for a level adjustment. The DC component of the HF signal is added to a tracking error signal TE' in the addition circuit 6.

Since the DC component of the HF signal fluctuates in proportion to variations in the laser output and the reflectance of the optical disk 1, the offsets of the tracking error signal TE' are compensated by means of the DC component of the HF signal in the first conventional example. In this way, after the tracking error signal TE' has been compensated in the addition circuit 6, a compensation for stabilization of a tracking control system is made in a phase compensation circuit 8 by means of an amplifier 7 for gain adjustment. A tracking coil 10 is driven by a tracking coil driving circuit 9 and the tracking control is carried out so that the light beam spot follows the track.

In the second conventional example, a method shown in FIG. 5 is adopted. Here, for convenience of explanation, those members of the second conventional example that have the same arrangement and function, and that are mentioned in the aforementioned first conventional example are indicated by the same reference numerals and description thereof is omitted.

In FIG. 5, the total amount of a reflected light from the optical disk 1 is detected by the optical system (not shown) in the optical pick-up 3, and becomes a total signal TS via a total signal detection circuit 15. The total signal TS is amplified in the head amplifier 16 and supplied to a divider 17. As shown in FIGS. 3(a) and 3(b), the amplitude and offset of the tracking error signal TE increase or decrease as the laser power or the reflectance of the optical disk 1 increases or decreases. At the same time, the total signal TS also increases or decreases accordingly. For this reason, when the tracking error signal TE' is standardized by dividing it by the total signal TS' in the divider 17, the amplitude and offsets of the tracking error signal TE' is always kept constant, and the standardized tracking error signal TE' is supplied to the addition circuit 6. Moreover, a constant offset compensation voltage E is applied to the addition circuit 6 via the variable resistor VR.

In this way, when the tracking error signal TE' is divided by the total signal TS', the amplitude of the tracking error signal TE' becomes constant regardless of a fluctuation in the laser output or the reflectance. As a result, since a constant amount of the offset occurs, a constant level of the offset compensation voltage is applied to the addition circuit 6.

However, the above conventional arrangement has the following problem.

Namely, since the offset compensation cannot be carried out at the time of recording by the art of the first conventional example (FIG. 4), the art cannot be applied to the optical disk 1 where information is recorded.

This problem is clarified by considering that the HF signal is outputted only at the time of reproducing, it is not clear whether or not the HF signal is outputted at the time of recording, and if outputted, it is not guaranteed that the DC component reflects the reflectance of the optical disk 1 and the laser output.

The art of the second conventional example (FIG. 5) is applicable to the optical disk apparatus where information is recorded, but has the problem that the divider 17 is necessary.

In general, since the divider 17 is expensive, it is an undesirable unit from a viewpoint of lowering the cost of the optical disk apparatus.

SUMMARY OF THE INVENTION

It is an object of the present invention to make the offset compensation possible with a simple arrangement at the time of recording and reproducing without using expensive parts.

In order to accomplish the above object, an offset compensation apparatus for a tracking error signal in an optical recording reproduction apparatus according to the present invention, includes:

creation means for creating a signal which is proportional to intensity of a light beam to be irradiated to an optical recording medium;

detection means for detecting the tracking error signal; and compensation means for compensating for an offset of the tracking error signal based upon the signal created in proportion to the intensity of the light beam.

With the above arrangement, since the offset of the tracking error signal is compensated based upon the signal which is proportional to the intensity of the irradiation light beam, the offset of the tracking error signal is compensated easily and accurately based upon the laser output which changes even in the optical recording reproduction apparatus, where the laser output changes frequently, such as a magneto-optical disk apparatus.

In the above arrangement, the compensation means is desirable to include:

means for specifying an amount and a polarity of the on occurring offset based upon the detected tracking error signal so as to output a corresponding multiplication data;

multiplication means for multiplying the signal created in proportion to the intensity of the light beam by the multiplication data which has been inputted; and addition means for adding the multiplication result and the tracking error signal which have been inputted.

With the above arrangement, the tracking error signal and the multiplication result are added, and a compensation is made so that positive and negative peak values of the tracking error signal become equal. Accordingly, the offset which occurs in the tracking error signal in proportion to the intensity of the light beam is cancelled. The amount and the polarity of the offset are found based upon the additional result.

For a fuller understanding of the nature and advantages of the invention, reference should be made to the ensuing detailed description taken in conjunction with the accompanying drawings.

BRIEF DESCRIPTION OF THE DRAWINGS

FIGS. 2(a) and 2(b) are waveforms of a tracking error signal and a total signal.

DESCRIPTION OF THE EMBODIMENT

Figure 1:
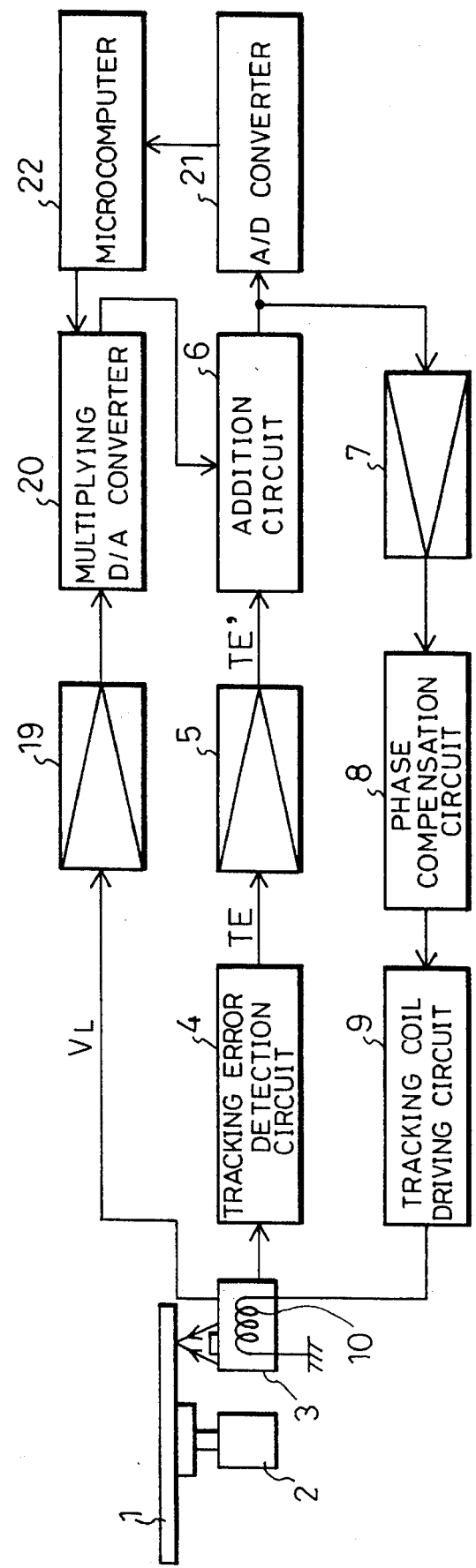
FIG. 1 showing an embodiment of the present invention is a schematic drawing which shows a construction of an optical disk apparatus.

Referring to FIG. 1, the following description will discuss an embodiment of the present invention. Here, for convenience of explanation, those members of the present embodiment that have the same arrangement and function, and that are mentioned in the aforementioned conventional example are indicated by the same reference numerals and description thereof is omitted.

An optical disk apparatus (optical recording reproduction apparatus) of the present embodiment compensates for an offset of a tracking error signal TE based upon a signal $V_L$ which fluctuates in proportion to a laser output (light beam output). For example, a laser output monitor voltage which has been obtained by photoelectrically converting the laser output by means of a photoelectrical transducer (not shown) is given as the signal $V_L$ which fluctuates in proportion to the laser output, but the signal $V_L$ is not limited to this, and any signals which fluctuate in accordance with a change in intensity of an light beam to be irradiated to an optical disk are applicable.

After being amplified by a head amplifier 19, the signal $V_L$ is supplied to a multiplying D/A (digital/analog) converter 20. The multiplying D/A converter 20 recognizes digital data (multiplication data) supplied by a microcomputer 22 as a coefficient, and multiplies an input signal by the coefficient so as to output the multiplied result. In other words, the multiplying D/A converter 20 functions as a sort of a variable resister capable of digitally changing an output, so adjusts the level of the signal $V_L$ which fluctuates in proportion to the laser output.

The adjusted signal is supplied to an addition circuit 6 and added to a tracking error signal TE' so that its offset is compensated. A compensation means mainly includes the multiplying D/A converter 20, the microcomputer 22, the additional circuit 6 which will be described later, and an A/D converter 21 which will be described later.

In the optical disk apparatus shown in FIG. 1, the compensation for the offset of the tracking error signal TE' is performed through the following procedure.

First, at the time of turning on the power source of the apparatus and replacing the optical disk, only a focus control for controlling an optical system (not shown) in an optical pick-up 3 is carried out so that a light beam spot is focused on the surface of an optical disk 1 (optical recording medium), but a tracking control for making the light beam spot follow a specified track is not carried out.

Figure 3A:
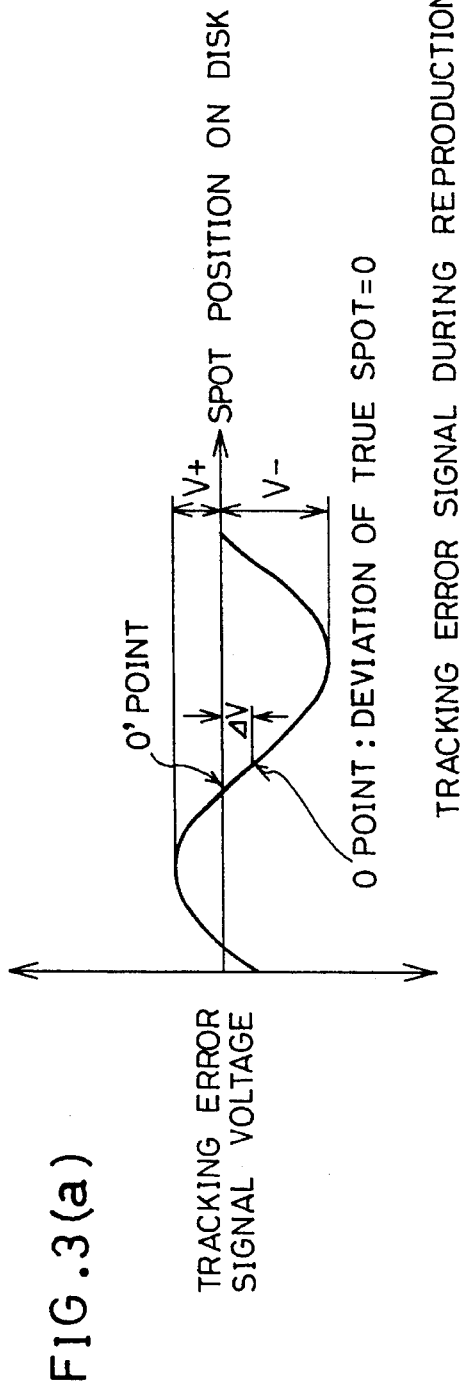
FIGS. 3(a) and 3(b) are waveforms of the tracking error signal.

At this time, if absolute values |V+| and |V−| of positive and negative peaks of the tracking error signal TE are not equal, an offset $\Delta V=(|V+|-|V-|)/2$ occurs (see FIG. 3(a)).

In this state, the tracking error signal TE is first transmitted directly to the addition circuit 6, and passes through the D/A converter 21. Thereafter, the tracking error signal TE is fetched by the microcomputer 22 so that the positive and negative peak values of the tracking error signal TE are obtained. Then, an amount of the offset and its polarity are calculated in the microcomputer 22 in accordance with the above formula.

Next, certain preset initial data (temporarily referred as α) are transmitted from the microcomputer 22 to the multiplying D/A converter 20. Then, the signal $V_L$ is multiplied by α in the multiplying D/A converter 20. The signal $\alpha.V_L$ which has been multiplied by α is added to the tracking error signal TE' in the addition circuit 6. The output of the addition circuit 6 is again monitored by the A/D converter 21 and the offset ΔV' is recalculated by using the above method. New data α' are transmitted to the multiplying D/A converter 20 so that the ΔV' becomes 0 based upon the obtained ΔV'.

−α'·$V_L$=ΔV is held by executing so-called feedback control which repeats the above procedure. In other words, data α', which make tracking error signal TE' become 0 in the output of the addition circuit 6, is determined.

As a result, the adjustment is made so that the tracking error signal TE is symmetric with respect to zero, that is, the positive and negative peak values become equal.

Figure 3B:
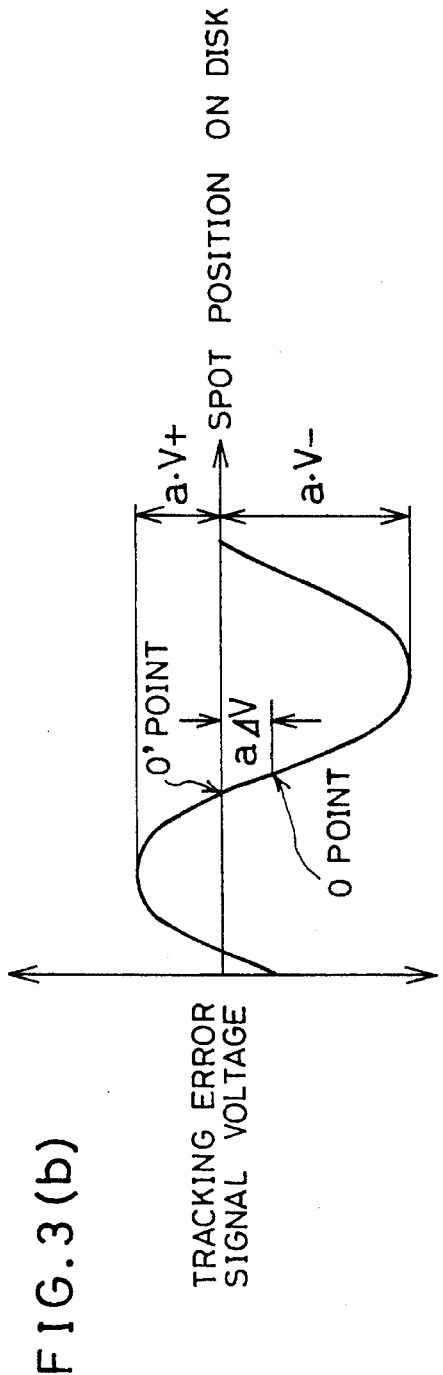
Figure 4:
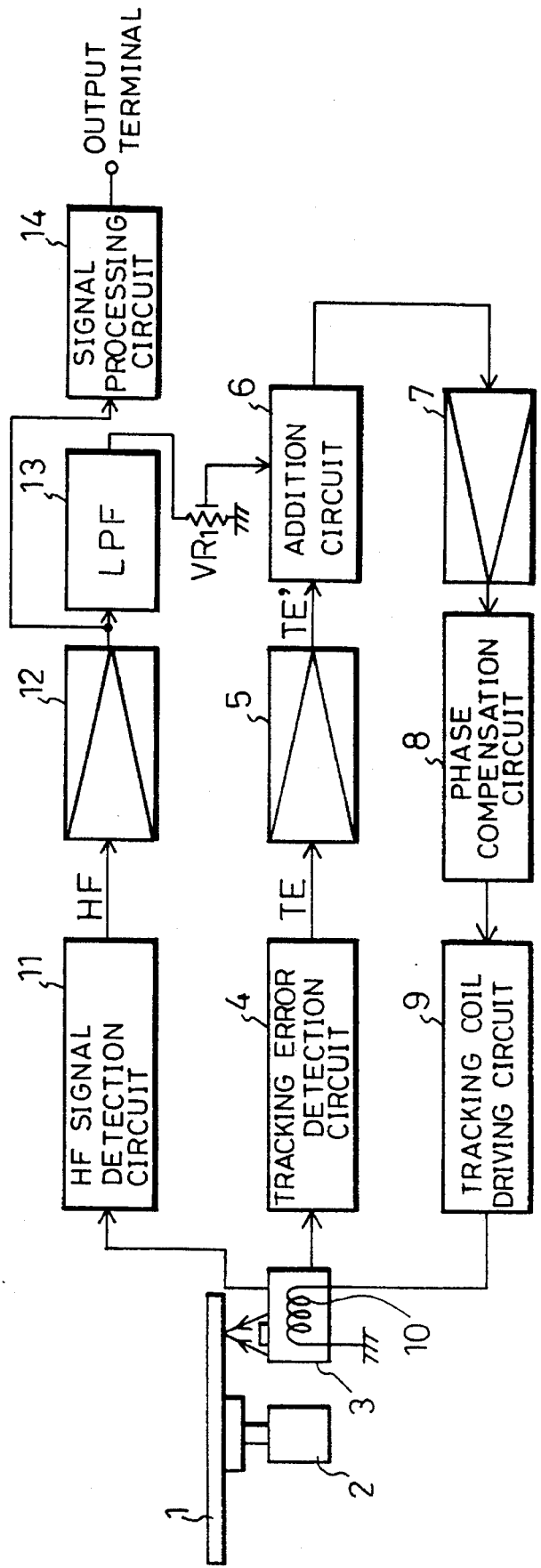
FIG. 4 is a schematic drawing which shows a construction of an optical disk apparatus of the first conventional example.
Figure 5:
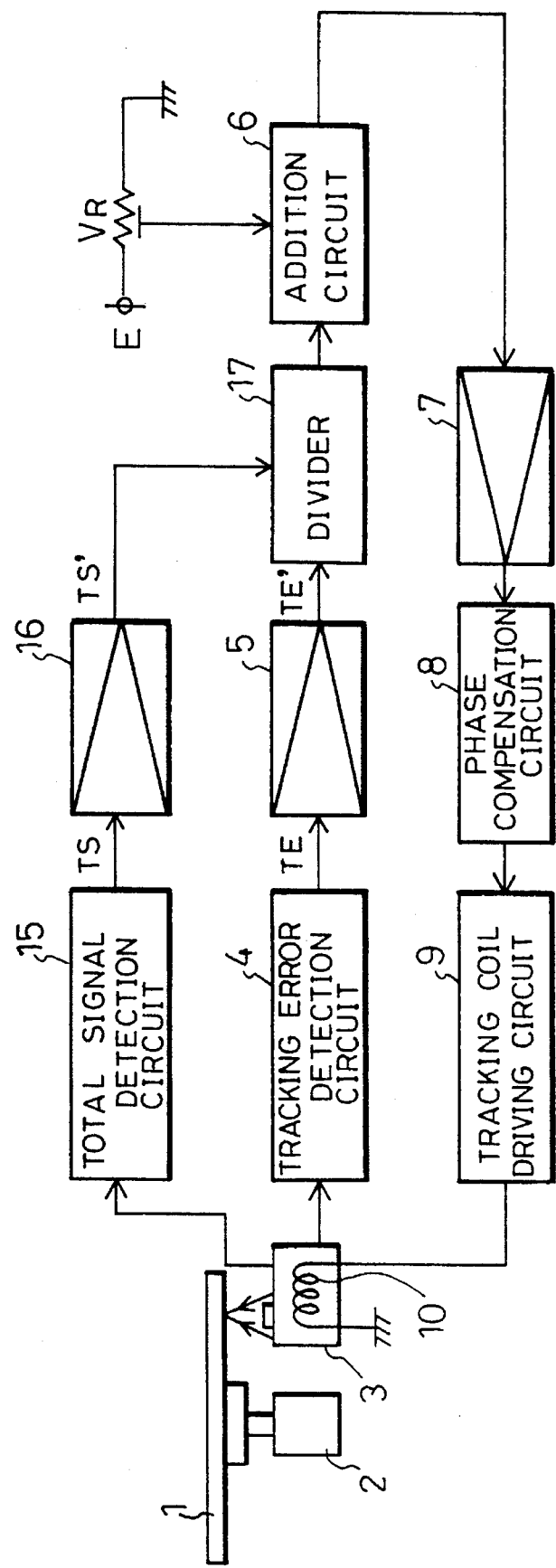
FIG. 5 is a schematic drawing which shows a construction of an optical disk apparatus of the second example.

Since the signal $V_L$ fluctuates in proportion to the laser output, if the laser output fluctuates to a times and the offset becomes a times accordingly, the signal $V_L$ fluctuates to a times (see FIG. 3(*b*)). This always ensures the most suitable offset compensation by using the above-mentioned method at the time of turning on the power source of the apparatus and replacing the optical disk even if the laser output fluctuates.

The signal $V_L$ does not fluctuate in accordance with the fluctuation in an amount of an offset caused by a peculiar difference of reflectance in the optical disk 1, but in the optical disk apparatus for recording and reproducing information, since a control is made so that the laser output changes several times to ten odd times at the time of recording and reproducing, the fluctuation in an offset amount caused by a change in the laser output is overwhelmingly greater than the fluctuation in the reflectance in the optical disk 1. For this reason, even the compensation method based upon the signal $V_L$ which is mentioned in the present embodiment can be used effectively.

In addition, since the signal $V_L$ is outputted regardless of recording and reproducing, the above method makes it possible to always compensate for the offset.

Here, referring to FIGS. 2(*a*) and 2(*b*), the following description will discuss a difference between in the case where the compensation for an offset amount ΔV of the tracking error signal TE is made based upon a total signal TS, and in the case where the compensation is made based upon the signal $V_L$. Incidentally, the total signal TS is a signal which shows the total of an amount of a reflected light from the optical disk 1, and which changes in accordance with the reflectance of the optical disk 1.

FIGS. 2(*a*) and 2(*b*) is a drawing showing how each waveform of the tracking error signal TE and the total signal TS change with a change in the spot position on the optical disk 1.

In the case where the compensation for the offset amount ΔV of the tracking error signal TE is made based upon the total signal TS with no tracking control carried out, after all, the compensation for the offset amount ΔV which is a constant value should be made based upon the total signal TS which fluctuates in accordance with the position of the light beam spot.

However, as to a normal optical disk, the tracking error signal TE fluctuates as the light beam spot traverses the track on the disk (see FIG. 2(*a*)), and the total signal TS also fluctuates with a fluctuation in the tracking error signal TE (see FIG. 2(*b*)). Meanwhile, as shown in FIG. 2(*a*), the offset amount ΔV of the tracking error signal TE does not fluctuate and is kept constant as far as the laser output or reflectance of the optical disk does not fluctuate.

In contrast, according to the present embodiment, since the signal $V_L$ is a signal which is directly proportional to an irradiation amount of the laser beam, the level of the signal $V_L$ does not fluctuate and is kept constant as far as the irradiating light amount does not fluctuate. In other words, the constant offset amount ΔV is compensated based upon the signal $V_L$ of the constant level. Therefore, the compensation for the offset amount can be made much more easily and accurately based upon the signal $V_L$ of the constant level as described in the embodiment than based upon the total signal TS which fluctuates as mentioned above.

In addition, since the signal $V_L$ is outputted regardless of recording or reproducing, in the present embodiment, it is possible to always compensate for an offset easily and accurately with a simple arrangement in which an expensive divider, an attenuator with a large-scale circuit, etc. are not utilized.

As mentioned above, the optical disk apparatus according to the present embodiment is arranged so as to include:

the detection means (for example, the photoelectrical transducer) for detecting the signal $V_L$ representing the amount of the laser beam to be irradiated to the optical disk 1; and the compensation means (addition circuit 6) for cancelling the offset by adding or subtracting the signal detected by the detection means to or from the tracking error signal TE representing the difference between the track and the laser beam spot on the optical disk 1. The signal $V_L$ representing the laser beam amount is a signal which is proportional to the intensity of the light beam.

With the above arrangement, since the signal which is proportional to intensity of the laser beam is added to or subtracted from the tracking error signal TE representing the difference between the track of the optical disk 1 and the laser beam spot on the optical disk 1, the offset which occurs in the tracking error signal TE in proportion to the intensity of the laser beam, is cancelled, so the offset of the tracking error signal TE is compensated.

In other words, since the signal $V_L$, which has been obtained by directly detecting the laser beam amount, is used as the signal which is proportional to the intensity of the laser beam, even in the case where the laser output changes, the compensation for the offset of the tracking error signal TE is always made accurately according to the change in the laser output. Therefore, the optical disk apparatus, where the compensation method of the present embodiment for the offset of the tracking error signal TE is adopted, is realizable with a simple arrangement.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An offset compensation apparatus for a tracking error signal in an optical recording reproduction apparatus, comprising:

means for providing a first signal which is proportional to intensity of a light beam to be irradiated to an optical recording medium;

means for providing a tracking error signal, said tracking error signal representing a position difference between a track of the optical recording medium and a light beam spot on the optical recording medium; and offset canceling means for compensating for offsets of the tracking error signal based upon said first signal, said offset canceling means including:

output means for determining a magnitude and a polarity of an offset based upon the tracking error signal and for outputting corresponding multiplication data;

multiplication means for multiplying said first signal by the multiplication data to produce a multiplication result; and addition means for combining the multiplication result and the tracking error signal so as to effect a cancellation of an existing offset.

2. The offset compensation apparatus as defined in claim 1, wherein said means for providing a first signal includes a photoelectrical transducer.

3. The offset compensation apparatus as defined in claim 1, further comprising:

an A/D (analog-to-digital) converter for converting the output of said addition means to a digital signal; and a control unit for specifying the magnitude and the polarity of an offset based upon the digital signal.

4. The offset compensation apparatus as defined in claim 3, wherein:

said control unit is a microcomputer; and said multiplication means comprises a multiplying D/A (digital-to-analog) converter.

5. An offset compensation method for a tracking error signal in an optical recording reproduction apparatus comprising the steps of:

(a) obtaining a signal which is proportional to intensity of a light beam to be irradiated to an optical recording medium;

(b) obtaining an amount and a polarity of an offset based upon a tracking error signal;

(c) obtaining multiplication data, which change in accordance with the amount and the polarity of the offset, and multiplying the multiplication data with the signal obtained in step (a) to obtain a multiplication result; and (d) compensating for the offset by combining a signal proportional to the tracking error signal and the multiplication result of step (c) so as to effect a cancellation of an existing offset.

6. An offset compensation method for providing offset compensation for a tracking error signal in an optical recording reproduction apparatus comprising the steps of:

(a) obtaining a signal which is proportional to intensity of a light beam to be irradiated to an optical recording medium;

(b) determining an amount and a polarity of an occurring tracking error signal offset based upon a detected tracking error signal;

(c) producing multiplication data, which change in accordance with the amount and the polarity of the offset, and multiplying the multiplication data with the signal obtained in step (a) to obtain a multiplication result signal; and (d) carrying out offset compensation such that a signal proportional to the tracking error signal and the multiplication result signal of step (c) are combined as to make positive signal peaks of the tracking error signal equal in magnitude to negative signal peaks of the tracking error signal, thereby canceling tracking error signal offsets which occur in the tracking error signal in proportion to the intensity of the light beam, wherein the amount and the polarity of the offset is determined based upon the combined signal result of step (d).

7. An offset compensation arrangement for a tracking error signal in an optical recording reproduction apparatus, comprising:

means for providing an intensity proportional signal both during a recording and a reproducing operation, which is directly proportional to intensity of a light beam spot irradiated on an optical recording medium, said intensity proportional signal not susceptible to tracking error signal fluctuations;

means for providing a tracking error signal, said tracking error signal representing a position difference between a track of the optical recording medium and a light beam spot on the optical recording medium; and offset canceling means, responsive to the intensity proportional signal and the tracking error signal, for compensating for an offset of the tracking error signal by canceling the offset in proportion to the intensity of the light beam spot in accordance with said intensity proportional signal so that positive and negative peak values of said tracking error signal become substantially equal, wherein offset compensation of said tracking error signal is operative both during a recording and a reproducing operation.

8. The offset compensation arrangement as defined in claim 7, wherein said means for providing an intensity proportional signal includes a photoelectrical transducer.

9. The offset compensation arrangement as defined in claim 7, wherein said offset canceling means comprises:

a means for summing at least two analog signals coupled to a multiplying D/A (digital-to-analog) converter controlled by a microcomputer.

10. In an optical recording/reproduction apparatus having an optical read head, said read head providing a first signal which is proportional to an intensity of a light beam spot irradiated on an optical recording medium by said read head, and a tracking error detection circuit, said tracking error detection circuit providing a tracking error signal representing a positional difference between a track of the optical recording medium and a light beam spot irradiated on the optical recording medium, an offset canceling circuit arrangement for compensating for offsets of the tracking error signal, comprising:

an offset processing circuit responsive to a second signal indicative of a magnitude and a polarity of an offset of the tracking error signal and outputting coefficient data corresponding to said offset;

a multiplying digital-to-analog (D/A) converter responsive to said first signal and to said coefficient data and outputting a multiplication result; and an addition circuit combining the multiplication result and the tracking error signal so as to effect a cancellation of an existing offset, wherein an output of said addition circuit is provided to said offset processing circuit as said second signal.

11. The offset canceling circuit arrangement as defined in claim 10, wherein said read head provides said first signal, which is proportional to an intensity of a light beam spot irradiated on the optical recording medium, both during a recording operation and a reproducing operation.

12. The offset canceling circuit arrangement as defined in claim 10, wherein said read head includes a photoelectrical transducer.

13. An offset canceling circuit arrangement as set forth in claim 10, wherein said offset processing circuit comprises an analog-to-digital (A/D) converter coupled to a microcomputer, said A/D converter providing a digital representation of said second signal and said microcomputer providing coefficient data to said multiplying D/A converter in response to said digital representation.

14. A method for providing offset compensation for a tracking error signal in an optical recording/reproduction apparatus both during a recording operation and a reproducing operation, comprising the steps of:

(a) obtaining a first signal that is proportional to intensity of a light beam spot irradiated on an optical recording medium both during a recording operation and a reproducing operation;

(b) obtaining a tracking error signal and providing second signal indicative of an amount and a polarity of a tracking error signal offset;

(c) producing coefficient data which changes in accordance with the amount and the polarity of the offset, and using the coefficient data together with said first signal obtained in step (a) to provide an offset canceling signal; and (d) combining said tracking error signal and said offset canceling signal so as to make positive signal peaks of the tracking error signal substantially equal in magnitude to negative signal peaks of said the tracking error signal, wherein tracking error signal offsets occurring in the tracking error signal are canceled in proportion to the intensity of said light beam spot and wherein said second signal of step (b) is indicative of the amount and the polarity of the offset is determined by the combined signals.

* * * * *